(12) United States Patent
Long et al.

(10) Patent No.: US 10,831,732 B2
(45) Date of Patent: Nov. 10, 2020

(54) BITMAP-BASED STORAGE SPACE MANAGEMENT SYSTEM AND METHODS THEREOF

(71) Applicant: CHANGSHA XINHONG SOFTWARE LTD., Changsha, Hunan (CN)

(72) Inventors: Hui Long, Hunan (CN); Zhijian Guan, Hunan (CN)

(73) Assignee: CHANGSHA XINHONG SOFTWARE LTD., Hunan (CN)

( * ) Notice: Subject to any disclaimer, the term of this patent is extended or adjusted under 35 U.S.C. 154(b) by 447 days.

(21) Appl. No.: 15/553,722

(22) PCT Filed: Feb. 29, 2016

(86) PCT No.: PCT/CN2016/074793
§ 371 (c)(1),
(2) Date: Aug. 25, 2017

(87) PCT Pub. No.: WO2016/138839
PCT Pub. Date: Sep. 9, 2016

(65) Prior Publication Data
US 2018/0239791 A1    Aug. 23, 2018

(30) Foreign Application Priority Data

Mar. 5, 2015   (CN) .......................... 2015 1 0097786

(51) Int. Cl.
*G06F 17/30*     (2006.01)
*G06F 16/22*     (2019.01)
(Continued)

(52) U.S. Cl.
CPC .......... *G06F 16/2237* (2019.01); *G06F 16/00* (2019.01); *G06F 16/122* (2019.01);
(Continued)

(58) Field of Classification Search
CPC ............... G06F 16/2237; G06F 16/122; G06F 16/1727; G06F 16/2365; G06F 16/00; G06F 16/13; G06F 12/00
See application file for complete search history.

(56) References Cited

U.S. PATENT DOCUMENTS

| | | | | |
|---|---|---|---|---|
| 5,784,699 A | * | 7/1998 | McMahon | G06F 12/023 711/170 |
| 6,640,290 B1 | * | 10/2003 | Forin | G06F 12/023 707/999.202 |

* cited by examiner

*Primary Examiner* — Usmaan Saeed
*Assistant Examiner* — William P Bartlett

(57) ABSTRACT

A bitmap-based storage space management system and methods thereof are provided, which realize divisible storage blocks that a small block is distributed when storing a small data object and a large block is distributed when storing a large data object. Through a two layer structure of index bitmaps and state bitmaps, a management of a storage space is realized. The index bitmaps comprise a main resource index bitmap (11), a large block index bitmap (12), a sub-resource index bitmap (13) and a small block index bitmap (14). The state bitmaps comprise a resource state bitmap (21) and a distribution state bitmap (22). Through the resource and distribution state bitmaps, the storage space is described respectively as an unoccupied divisible state, an occupied divisible state and an occupied indivisible state. In an above storage space structure, large block distribution, small block distribution, large block release and small block release are realized.

7 Claims, 6 Drawing Sheets

(51) Int. Cl.
*G06F 16/23* (2019.01)
*G06F 16/00* (2019.01)
*G06F 16/13* (2019.01)
*G06F 16/11* (2019.01)
*G06F 16/17* (2019.01)
(52) U.S. Cl.
CPC .......... *G06F 16/13* (2019.01); *G06F 16/1727* (2019.01); *G06F 16/2365* (2019.01)

BITMAP-BASED STORAGE SPACE MANAGEMENT SYSTEM AND METHODS THEREOF

CROSS REFERENCE OF RELATED APPLICATION

This is a U.S. National Stage under 35 U.S.C 371 of the International Application PCT/CN2016/074793, filed Feb. 29, 2016, which claims priority under 35 U.S.C. 119(a-d) to CN 201510097786.8, filed Mar. 5, 2015.

BACKGROUND OF THE PRESENT INVENTION

Field of Invention

The present invention relates to a storage space management system, and more particularly to a bitmap-based storage space management system and methods thereof.

Description of Related Arts

The bitmap method is to represent the distribution and use condition of the clusters in the storage volumes or the partitions according to the data bits of the bitmap structure, which is simple and easy to realize. Most of the file systems adopt the bitmap to manage the storage system.

For example, the file allocation table (FAT) file system of the Windows operating system adopts the file allocation table which is a chain structure introduced through disk data indexing and positioning in the FAT file system. In the FAT file system, the memory has a specific FAT area which describes the size of the storage space occupied by each file in the file system and converts the storage space structure into the cluster distribution chain table of one file. The file storage proceeds according to the cluster chain data structure in the FAT table.

For example, the Linux system adopts the second extended file system (Ext2) which is a non-journaling file system. A disk partition formatted as the Ext2 file system is divided into a boot partition followed by a plurality of block groups, wherein each block group comprises a super block, block group description, a data block bitmap, an i-node bitmap, an i-node table, and a data block; the super block is for storing information of the file system, and the super block of each block group in the file system contains the same content; the block group description is for storing information of the block group; the data block bitmap is for managing the idle data blocks; the i-node bitmap is for managing the idle i-nodes; the i-node table is for storing the i-node table, each file corresponds to one i-node table, and the i-node table is further for managing the metadata of the file (such as uid, gid, ctime, dtime and the pointer directed to the data block); and the data block is for storing the actual user data.

Whether the Windows system or the Linux system, the conventional bitmap of the operation system for managing the storage space is relatively easy, namely one bit represents a fixed storage block size. If the distributed space of each block is too small, the efficiency will decrease when storing and accessing the large data object; if the distributed space of each block is too large, a lot of space will be wasted when storing the small data object.

SUMMARY OF THE PRESENT INVENTION

A brief description of one aspect or various aspects of the present invention is described as follows, for providing a basic understanding. The brief description is not a detailed overview of all imaginable aspects, and not for pointing out key factors or decisive factors of all aspects and defining a range of any aspect or all aspects. The brief description is only for providing some concepts of one aspect or various aspects in a reduced form to serve as a preface of a later-described more detailed description.

In order to solve above problems in prior arts, the present invention provides a bitmap-based storage space management system and methods thereof, which distribute a small block when storing a small data object and distribute a large block when storing a large data object.

The present invention provides a bitmap-based storage space management system, comprising:

an index bitmap configuration module, for configuring index bitmaps at an upper layer, wherein the index bitmaps comprise a main resource index bitmap, a large block index bitmap, a sub-resource index bitmap and a small block index bitmap; and a state bitmap configuration module, for configuring state bitmaps at a lower layer, wherein the state bitmaps comprise a resource state bitmap and a distribution state bitmap which are paratactic; a resource state bit of the resource state bitmap and a distribution state bit at a corresponding position of the distribution state bitmap correspond to a same storage block in a storage space; a plurality of the resource state bits constitute a resource state bitmap unit; a plurality of the distribution state bits constitute a distribution state bitmap unit; one resource state bitmap unit and one corresponding distribution state bitmap unit constitute a state bitmap unit; a binary value of each bit in the resource state bitmap indicates whether a corresponding storage block is occupied, and a binary value of each bit in the distribution state bitmap indicates whether the corresponding storage block is able to be further divided;

wherein: each index bit of the index bitmaps corresponds to one state bitmap unit; through a binary value of each index bit, whether the index bit is valid is indicated; the main resource index bitmap is for indexing a state bitmap unit which comprises an idle storage block and is not used in large block distribution or small block distribution; the sub-resource index bitmap is for indexing a state bitmap unit which is used in the small block distribution without all resource state bits being occupied; the large block index bitmap is for indexing a state bitmap unit can be used in the large block distribution; and the small block index bitmap is for indexing a state bitmap unit can be used in the small block distribution.

Preferably, the index bitmap configuration module configures the index bitmaps of multiple layers.

Preferably, each index bitmap of the index bitmap configuration module and each state bitmap of the state bitmap configuration module are divided into a plurality of small blocks, and the correlated small blocks of each bitmap are collected together to be managed.

Preferably, the resource state bitmap and the distribution state bitmap of the state bitmap configuration module configure a state of each storage block in the storage space as an unoccupied divisible state, an occupied divisible state or an occupied indivisible state. When distributing a large block, the state bitmap configuration module modifies corresponding state bits of the storage block in the resource state bitmap and the distribution state bitmap at the same time, so as to configure the state of the storage block as the occupied indivisible state. When distributing small blocks, at a first operation, the corresponding state bits of the storage block in the resource state bitmap and the distribution state bitmap are modified, so as to configure the state of the storage block as the occupied divisible state; until the whole storage block is divided into the small storage blocks, the corresponding state bits of the storage block in the resource state bitmap and the distribution state bitmap are modified, so as to configure the state of the storage block as the occupied indivisible state.

The present invention further provides a method for implementing the large block distribution in the bitmap-based storage space management system, which implements the large block distribution of the storage block in the above-described storage space management system, comprising steps of:

according to a priority sequence of the large block index bitmap, the main resource index bitmap and the sub-resource index bitmap, finding a valid index bit of a state bitmap unit can be used in the large block distribution;

if finding the valid index bit in the large block index bitmap, ensuring that a corresponding index bit in the main resource index bitmap is invalid; if finding the valid index bit in the main resource index bitmap, setting a corresponding index bit in the large block index bitmap to be valid, and meanwhile setting the index bit in the main resource index bitmap to be invalid; if finding the valid index bit in the sub-resource index bitmap, finding a residual storage block can be used in the large block distribution in a state bitmap unit used in the small block distribution;

after finding the valid index bit in the previous step, finding a distributable storage block in a corresponding resource state bitmap unit, and returning a logical address of the distributable storage block back; and meanwhile, setting corresponding state bits of the distributed storage block in the resource state bitmap and the distribution state bitmap to be invalid; and if all state bits of a current resource state bitmap unit are invalid, setting corresponding index bits of the current resource state bitmap unit in the index bitmaps to be invalid, meanwhile checking whether a distribution state bitmap unit corresponding to the resource state bitmap unit still comprises a valid state bit, and setting a state of a corresponding index bit in the small block index bitmap.

The present invention further provides a method for implementing the small block distribution in the bitmap-based storage space management system, which implements the small block distribution of the storage block in the above-described storage space management system, comprising steps of:

according to a priority sequence of the small block index bitmap, the main resource index bitmap and the large block index bitmap, finding a valid index bit of a state bitmap unit can be used in the small block distribution;

if finding the valid index bit in the small block index bitmap, directly executing a next step; if finding the valid index bit in the main resource index bitmap, setting corresponding index bits in the small block index bitmap and the sub-resource index bitmap to be valid, meanwhile setting corresponding index bits in the main resource index bitmap and the large block index bitmap to be invalid, and then executing the next step; if finding the valid index bit in the large block index bitmap, directly executing the next step;

after finding the valid index bit, in a distribution state bitmap unit corresponding to the valid index bit, finding a storage block can be used in the small block distribution; dividing a small block from the storage block can be used in the small block distribution for implementing the small block distribution, and ensuring that a state bit of a resource state bitmap unit corresponding to the storage block used in the small block distribution is invalid;

if the whole storage block is divided and distributed, setting a corresponding state bit in the distribution state bitmap unit to be invalid; and if all the state bits of the distribution state bitmap unit are invalid, setting corresponding index bits of the distribution state bitmap unit in the index bitmaps to be invalid.

The present invention further provides a method for implementing large block release in the bitmap-based storage space management system, which implements the large block release in the above-described storage space management system, comprising steps of:

setting corresponding state bits of the storage block in a resource state bitmap unit and a distribution state bitmap unit to be valid;

if only one state bit in the distribution state bitmap unit is valid, updating a state of a corresponding index bit in the main resource index bitmap;

if all state bits in the state bitmap unit are valid, recovering corresponding index bits in the main resource index bitmap, the large block index bitmap, the sub-resource index bitmap and the small block index bitmap to an initial state; and if the state bitmap unit is still not be completely released, checking a corresponding index bit in the small block index bitmap, and determining whether the state bitmap unit is in the small block index bitmap; if the state bitmap unit is in the small block index bitmap, ensuring that a corresponding index bit of the state bitmap unit in the sub-resource index bitmap is valid.

The present invention further provides a method for implementing small block release in the bitmap-based storage space management system, which implements the small block release in the above-described storage space management system, comprising steps of:

checking whether a small block to be released is a first small block in the whole storage block;

if the small block is the first small block in the whole storage block, setting a corresponding state bit in a distribution state bitmap unit to be valid; if only one state bit in the distribution state bitmap unit is valid, setting a corresponding index bit of the distribution state bitmap unit in the small block index bitmap to be valid;

if all small blocks of the storage block are released, setting a corresponding state bit in a resource state bitmap unit to be valid; when all state bits in the resource state bitmap unit and the distribution state bitmap unit are valid, recovering corresponding index bits in the main resource index bitmap, the large block index bitmap, the sub-resource index bitmap and the small block index bitmap to an initial state; and if the small blocks of the storage block are not all released, checking a corresponding index bit in the small block index bitmap, so as to determine whether the state bitmap unit is in the small block index bitmap; if the state bitmap unit is in the small block index bitmap, ensuring that a corresponding index bit of the state bitmap unit in the sub-resource index bitmap is valid.

Compared with the prior arts, the present invention has following beneficial effects. Through a two layer structure of the index bitmaps and the state bitmaps, the present invention realizes a management of the storage space, wherein the index bitmaps comprise the main resource index bitmap, the large block index bitmap, the sub-resource index bitmap and the small block index bitmap; and the state bitmaps comprise the resource state bitmap and the distribution state bitmap. Through the resource state bitmap and the distribution state bitmap, the storage space is described as three states, respectively the unoccupied divisible state, the occupied divisible state and the occupied indivisible state. Under the above storage space structure, the large block distribution, the small block distribution, the large block release and the small block release of the storage space are realized. Compared with the conventional storage space management technology through the bitmap, the storage block of the present invention is divisible; and moreover, a small block storage space is distributed when storing the small data object, and a large block storage space is distributed when storing the large data object.

DETAILED DESCRIPTION OF THE PREFERRED EMBODIMENT

Figure 1:
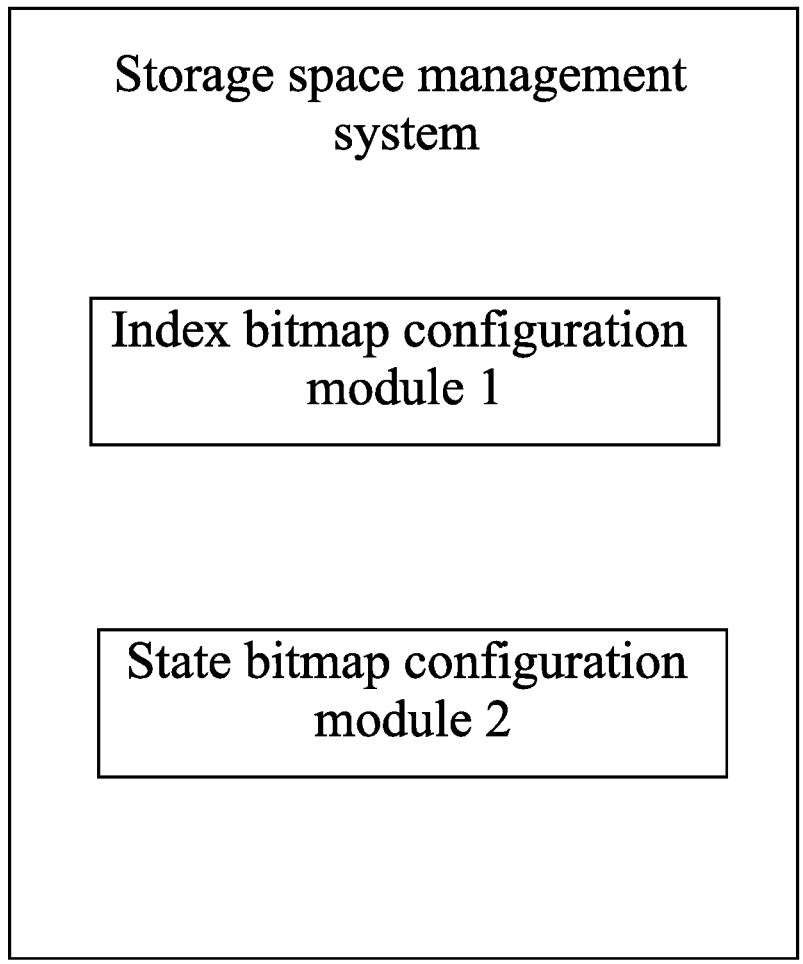
FIG. 1 is a principle sketch view of a bitmap-based storage space management system according to a preferred embodiment of the present invention.

After reading the following detailed description of the disclosed preferred embodiment of the present invention combined with the accompanying drawings, the above features and advantages of the present invention will be better understood. In the accompanying drawings, every part is not drawn to scale, and parts having the similar correlated characteristics or features may have the same or similar reference character.

Figure 2:
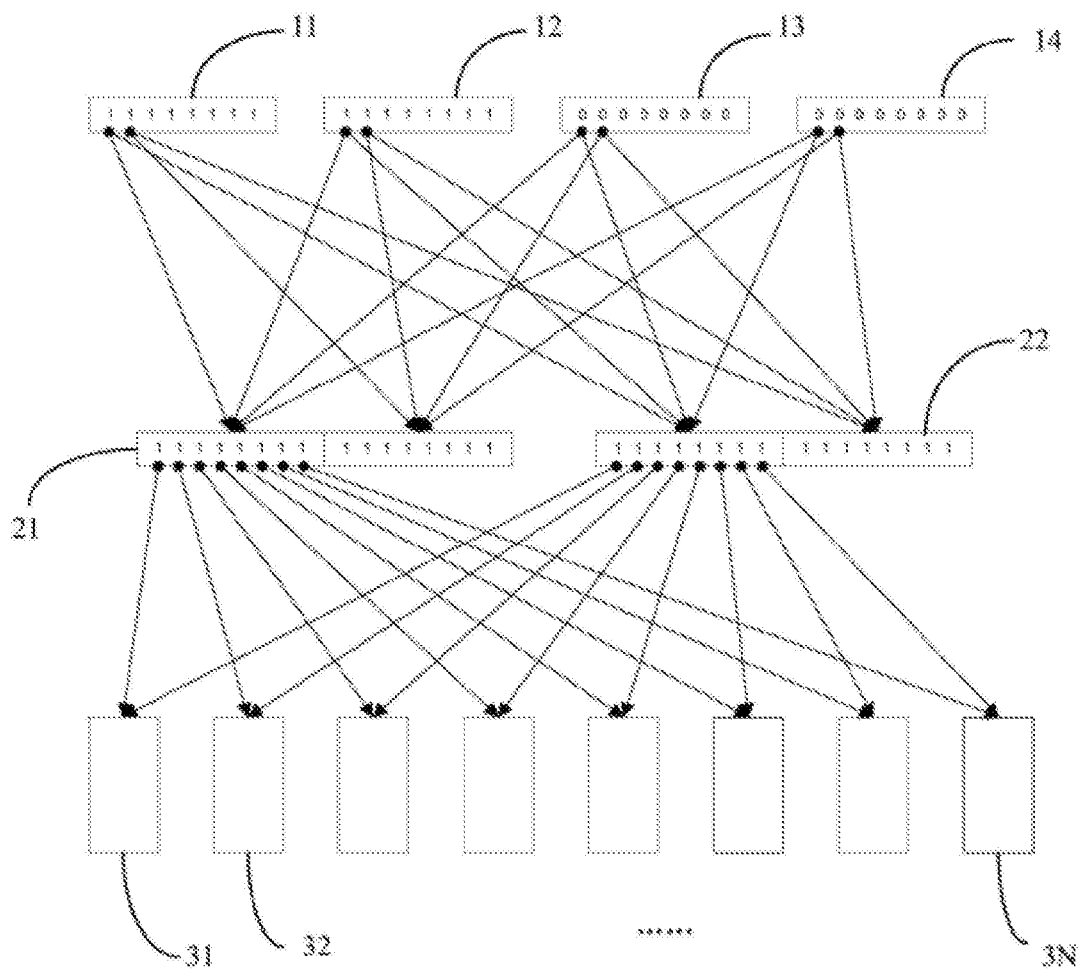
FIG. 2 is a sketch view of a bitmap structure according to the preferred embodiment of the present invention.

FIG. 1 shows a principle of a bitmap-based storage space management system according to the preferred embodiment of the present invention. Referring to FIG. 1, the storage space management system provided by the present invention comprises an index bitmap configuration module 1 and a state bitmap configuration module 2. An example of a bitmap structure is as shown in FIG. 2. Combined with FIG. 2, the index bitmap configuration module 1 is for configuring index bitmaps at an upper layer. As shown in FIG. 2, the index bitmaps comprise a main resource index bitmap 11, a large block index bitmap 12, a sub-resource index bitmap 13 and a small block index bitmap 14.

The state bitmap configuration module 2 is for configuring state bitmaps at a lower layer. The state bitmaps comprise a resource state bitmap 21 and a distribution state bitmap 22 which are paratactic, wherein a resource state bit of the resource state bitmap and a distribution state bit at a corresponding position of the distribution state bitmap correspond to a same storage block (such as storage blocks 31 to 3N) in a storage space. A plurality of the resource state bits constitutes a resource state bitmap unit, and in FIG. 2, eight resource state bits constitute one resource state bitmap unit. A plurality of the distribution state bits constitutes a distribution state bitmap unit, and in FIG. 2, eight distribution state bits constitute one distribution state bitmap unit. One resource state bitmap unit and one corresponding distribution state bitmap unit constitute a state bitmap unit. A binary value of each bit in the resource state bitmap indicates whether a corresponding storage block is occupied, and a binary value of each bit in the distribution state bitmap indicates whether the corresponding storage block can be further divided into smaller storage blocks to be used.

The corresponding state bits of the resource state bitmap and the distribution state bitmap correspond to the same storage block in the storage space. Therefore, for the same storage block, the resource state bitmap and the distribution state bitmap describe three states of the storage block, respectively an unoccupied divisible state, an occupied divisible state and an occupied indivisible state. When distributing a large block, the state bitmap configuration module 2 modifies the corresponding state bits of the storage block in the resource state bitmap and the distribution state bitmap at the same time, so that the state of the storage block is modified from the unoccupied divisible state to the occupied indivisible state. When distributing small blocks, at a first operation, the corresponding state bits of the storage block in the resource state bitmap and the distribution state bitmap are modified, so that the state of the storage block is modified from the unoccupied divisible state to the occupied divisible state; until the whole storage block is divided into the small storage blocks, the corresponding state bits of the storage block in the resource state bitmap and the distribution state bitmap are modified, so that the state of the storage block is modified from the occupied divisible state to the occupied indivisible state.

Each index bit in the index bitmaps corresponds to one state bitmap unit (namely each index bit corresponds to one resource state bitmap unit and one distribution state bitmap unit at the lower layer). Through a binary value of each index bit, whether the index bit is valid is indicated. Through the above structure of the index bitmaps, a position of the available unit of the state bitmaps at the lower layer is able to be rapidly found. In a specific implementation, a layer number of the index bitmaps is able to be expanded, so as to rapidly find a position of the available storage block and support a management of a larger scale of the storage space. The four types of the index bitmaps have following differences. The main resource index bitmap is for indexing a state bitmap unit which comprises an idle storage block and is not used in large block distribution or small block distribution; the sub-resource index bitmap is for indexing a state bitmap unit which is used in the small block distribution without all resource state bits being occupied; the large block index bitmap is for indexing a state bitmap unit can be used in the large block distribution; and the small block index bitmap is for indexing a state bitmap unit can be used in the small block distribution.

Illustrating with the example shown in FIG. 2, in the index bitmaps, "1" represents "valid" and "0" represents "invalid"; in the resource state bitmap, "1" represents "unoccupied" and "0" represents "occupied"; and, in the distribution state bitmap, "1" represents "distributable" and "0" represents "undistributable". In a practical application, meanings of "1" and "0" can be defined according to an own understanding. FIG. 2 shows a simple relationship hierarchical structure of the index bitmaps, the state bitmaps and the storage blocks. The four index bitmaps are located at a highest layer and from left to right are successively the main resource index bitmap 11, the large block index bitmap 12, the sub-resource index bitmap 13 and the small block index bitmap 14. When initializing, each index bit of the main resource index bitmap 11 and the large block index bitmap 12 is in a valid state, and each index bit of the sub-resource index bitmap 13 and the small block index bitmap 14 is in an invalid state, namely the whole storage space is initially distributable and no storage block is occupied. The two state bitmaps are located at an intermediate layer, respectively the resource state bitmap 21 and the distribution state bitmap 22. For a showing purpose, in FIG. 2, only two bitmap units consisting of eight bits are drawn for each state bitmap. In the practical application, a bit number of each unit is determined according to actual requirements and can be 16, 32, 64, and so on. In FIG. 2, connecting lines among the four index bitmaps and the two state bitmaps show a corresponding relationship between each index bit of the index bitmaps and each state bitmap unit of the state bitmaps, and also show a paratactic relationship among the units of the two state bitmaps. The storage blocks are located at a lowest layer, and a corresponding relationship among the storage blocks and the state bitmaps is showed. The corresponding bits of the paratactic units in the two state bitmaps correspond to the same storage block.

Based on the above bitmap-based storage space management system, operations of large block distribution, small block distribution, large block release and small block release are implemented for data storage and respectively illustrated with FIGS. 3-6 as follows.

Figure 3:
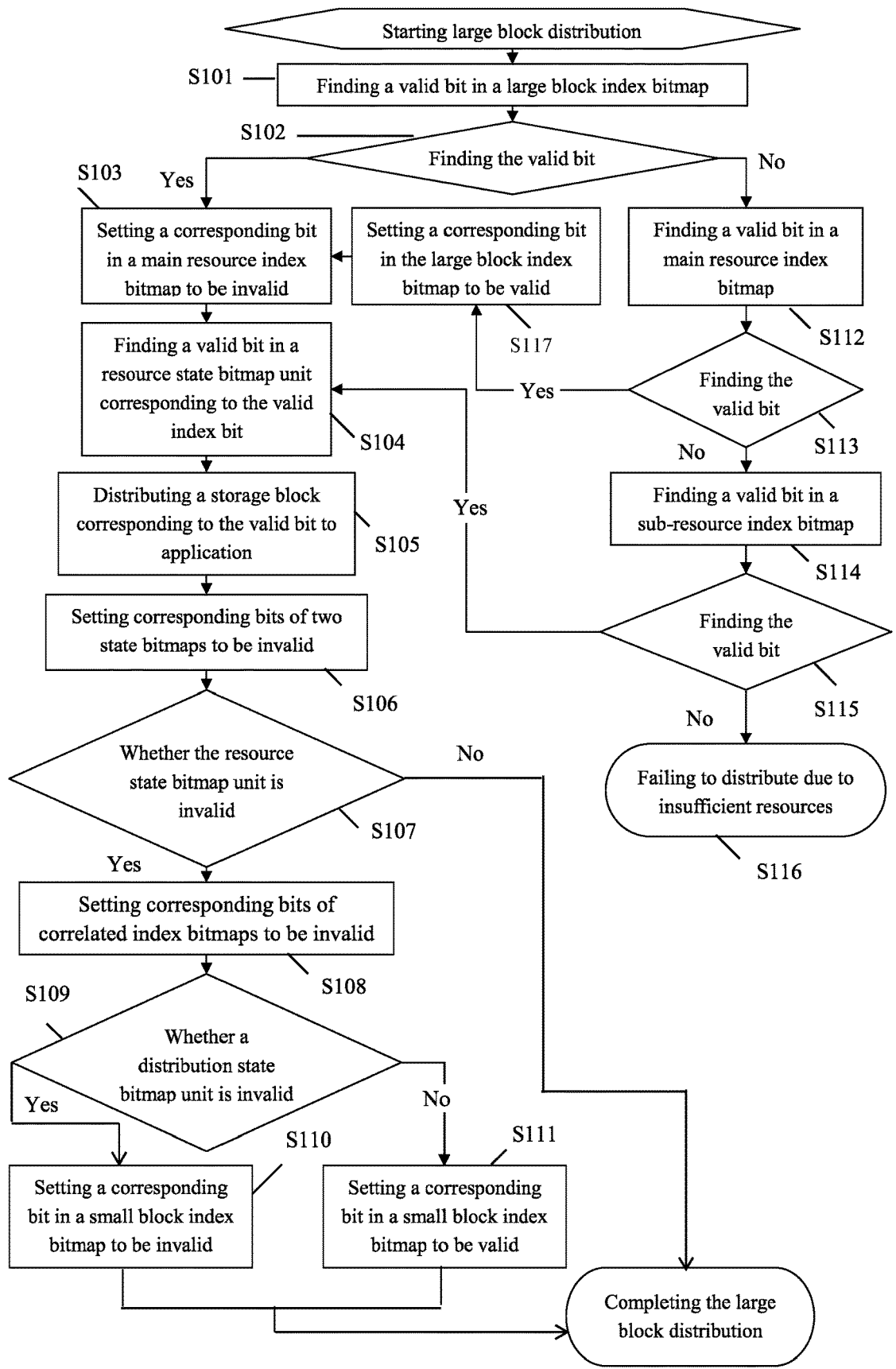
FIG. 3 is a flow chart of a method for implementing large block distribution in the bitmap-based storage space management system according to the preferred embodiment of the present invention.

FIG. 3 shows a process of a method for implementing the large block distribution in the bitmap-based storage space management system, comprising steps of:

S101, finding a valid bit in the large block index bitmap, and continuing executing a step of S102; wherein: a primary task of the preferred embodiment is to find a state bitmap unit can be used in the large block distribution; from steps of S101, S112 and S114, it can be seen that when finding the index bit in the large block index bitmap, the main resource index bitmap and the sub-resource index bitmap, a priority sequence thereof is successively the large block index bitmap, the main resource index bitmap and the sub-resource index bitmap;

S102, judging whether it is able to find the valid bit in the large block index bitmap; if the valid bit (also called a valid index bit) is able to be found, executing a step of S103; if the valid bit is unable to be found, executing the step of S112;

S103, setting a corresponding index bit of the main resource index bitmap to be invalid, and continuing executing a step of S104; wherein an object of the step of S103 is to ensure that the corresponding bit of the main resource index bitmap is invalid when the valid index bit is found in the large block index bitmap, so as to represent that the state bitmap unit corresponding to the valid index bit is used in the large block distribution by priority;

S104, finding a valid bit in the resource state bitmap unit corresponding to the valid bit of the index bitmap, and continuing executing a step of S105; wherein the valid bit in the resource state bitmap unit represents a storage block can be used in the large block distribution;

S105, distributing the storage block corresponding to the valid bit in the resource state bitmap unit to application, and continuing executing a step of S106; wherein the step of S105 is realized through calculating a logical address of the storage block corresponding to the found valid bit and returning the logical address back to the application;

S106, setting the state bits in the resource state bitmap unit and the distribution state bitmap unit, corresponding to the distributed storage block, to be invalid, so as to represent that the whole storage block is occupied; and continuing executing a step of S107;

S107, judging whether all the state bits in the resource state bitmap unit become invalid; if all the state bits in the resource state bitmap unit are invalid, illustrating that all the storage blocks included in the resource state bitmap unit are occupied, and continuing executing a step of S108; if not all the state bits in the resource state bitmap unit are invalid, illustrating that the large block distribution is completed, and ending the process;

S108, setting the corresponding index bits in the related index bitmaps to be invalid, and continuing executing a step of S109; wherein: because all the storage blocks included in the resource state bitmap unit are occupied, the corresponding index bits in the index bitmaps which are able to index the resource state bitmap unit should be invalid;

S109, checking whether the distribution state bitmap unit corresponding to the resource state bitmap unit still comprises a valid state bit; wherein: an object of checking the distribution state bitmap unit is to determine whether the distribution state bitmap unit still comprises the storage block can be used in the small block distribution and set a correlated state of a corresponding bit in the small block index bitmap; if all the state bits in the distribution state bitmap unit are invalid, illustrating that all the storage blocks corresponding to the distribution state bitmap unit are unable to be further divided, and continuing executing a step of S110; if the distribution state bitmap unit has a valid state bit, illustrating that the distribution state bitmap unit still comprises the storage block can be used in the small block distribution, and continuing executing a step of S111;

S110, because all the corresponding storage blocks of the distribution state bitmap unit are unable to be further divided, setting the index bit in the small block index bitmap, corresponding to the distribution state bitmap unit, to be invalid; and completing the large block distribution, namely the process ends;

S111, because the distribution state bitmap unit still comprises the storage block can be used in the small block distribution, setting the index bit of the small block index bitmap, corresponding to the distribution state bitmap unit, to be valid; and completing the large block distribution, namely the process ends;

S112, finding a valid bit in the main resource index bitmap, and continuing executing a step of S113;

S113, judging whether it is able to find the valid bit in the main resource index bitmap; if it is able to find the valid bit in the main resource index bitmap, executing a step of S117; if it is unable to find the valid bit in the main resource index bitmap, illustrating that no storage space is idle and the storage space can be used in the large block distribution is exhausted, and executing the step of S114;

S114, finding a valid bit in the sub-resource index bitmap, and continuing executing a step of S115; wherein: when the step of S114 is executed, it is illustrated that no storage space is idle and the storage space can be used in the large block distribution is exhausted, the system at the moment is in a resource shortage state, and the residual state bit can only be found in the state bitmap unit which is used in the small block distribution by priority;

S115, judging whether it is able to find the valid bit in the sub-resource index bitmap; if it is able to find the valid bit in the sub-resource index bitmap, executing the step of S104; if it is unable to find the valid bit in the sub-resource index bitmap, executing a step of S116;

S116, failing to distribute due to insufficient resources; wherein: when the step of S116 is executed, it is illustrated that the storage space is exhausted and the large block distribution is unable to be completed; and S117, setting a corresponding bit in the large block index bitmap to be valid, and executing the step of S103.

Figure 4:
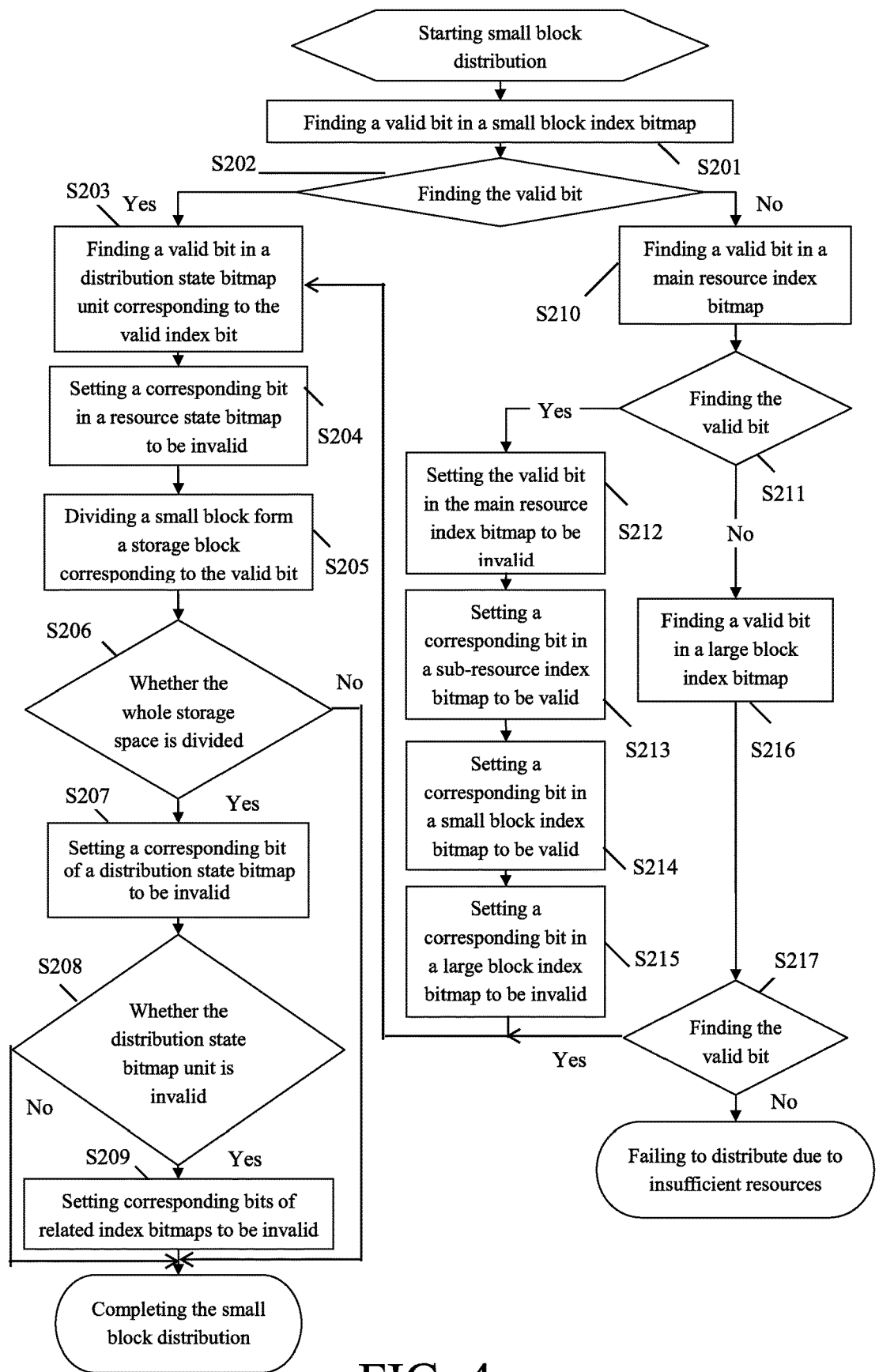
FIG. 4 is a flow chart of a method for implementing small block distribution in the bitmap-based storage space management system according to the preferred embodiment of the present invention.

FIG. 4 shows a process of a method for implementing the small block distribution in the bitmap-based storage space management system, comprising steps of:

S201, finding a valid bit in the small block index bitmap, and continuing executing a step of S202; wherein: a primary task of the preferred embodiment is to find a state bitmap unit can be used in the small block distribution; from steps of S201, S210 and S216, it can be seen that when finding the index bit in the small block index bitmap, the main resource index bitmap and the large block index bitmap, a priority sequence thereof is successively the small block index bitmap, the main resource index bitmap and the large block index bitmap;

S202, judging whether it is able to find the valid bit in the small block index bitmap; if the valid bit is able to be found, continuing executing a step of S203; if the valid bit is unable to be found, continuing executing the step of S210:

S203, finding a valid bit in the distribution state bitmap unit corresponding to the index bit, and continuing executing a step of S204;

S204, setting a state bit of the resource state bitmap unit, corresponding to the valid bit found in the step of S203 of the distribution state bitmap unit, to be invalid; and continuing executing a step of S205; wherein an object of the step of S204 is to ensure that the corresponding bit of the resource state bitmap unit is invalid when the valid bit is found;

S205, dividing a small block from the storage block corresponding to the valid state bit, and continuing executing a step of S206; wherein: in the step of S205, a logical address of the storage block corresponding to the valid state bit is calculated, and then the small block is divided from the storage block for application;

S206, judging whether a whole space of the storage block is divided; if the whole space of the storage block is divided, continuing executing a step of S207; if not the whole space of the storage block is divided, illustrating that the small block distribution is completed, and ending the process;

S207, setting the corresponding bit in the distribution state bitmap unit to be invalid, and continuing executing a step of S208;

S208, judging whether all the state bits in the distribution state bitmap unit are invalid; if all the state bits are invalid, continuing executing a step of S209; if not all the state bits are invalid, illustrating that the small block distribution is completed, and ending the process;

S209, setting the index bits in the index bitmaps which are able to index the distribution state bitmap unit to be invalid, illustrating that the small block distribution is completed at the moment, and ending the process;

S210, finding a valid index bit in the main resource index bitmap, and continuing executing a step of S211;

S211, judging whether it is able to find the valid index bit; if it is able to find the valid index bit, continuing executing a step of S212; if it is unable to find the valid index bit, continuing executing the step of S216;

S212, setting the valid bit found in the main resource index bitmap to be invalid, and continuing executing a step of S213;

S213, setting a corresponding index bit of the sub-resource index bitmap to be valid, and continuing executing a step of S214;

S214, setting a corresponding index bit of the small block index bitmap to be valid, and continuing executing a step of S215;

S215, setting a corresponding index bit of the large block index bitmap to be invalid, and continuing executing the step of S203; wherein from the steps of S212 to S215, the corresponding index bits in the small block index bitmap and the sub-resource index bitmap are set to be valid, and the corresponding index bits in the main resource index bitmap and the large block index bitmap are set to be invalid, so as to represent that the state bitmap unit corresponding to the index bit is used in the small block distribution by priority;

S216, finding a valid bit in the large block index bitmap, and continuing executing a step of S217; and S217, judging whether it is able to find the valid bit in the large block index bitmap; if it is able to find the valid bit, executing the step of S215; if it is unable to find the valid bit, illustrating that no valid bit can be found in the small block index bitmap, the main resource index bitmap and the large block index bitmap, and the storage space is exhausted and fails to complete the small block distribution, and ending the process.

Figure 5:
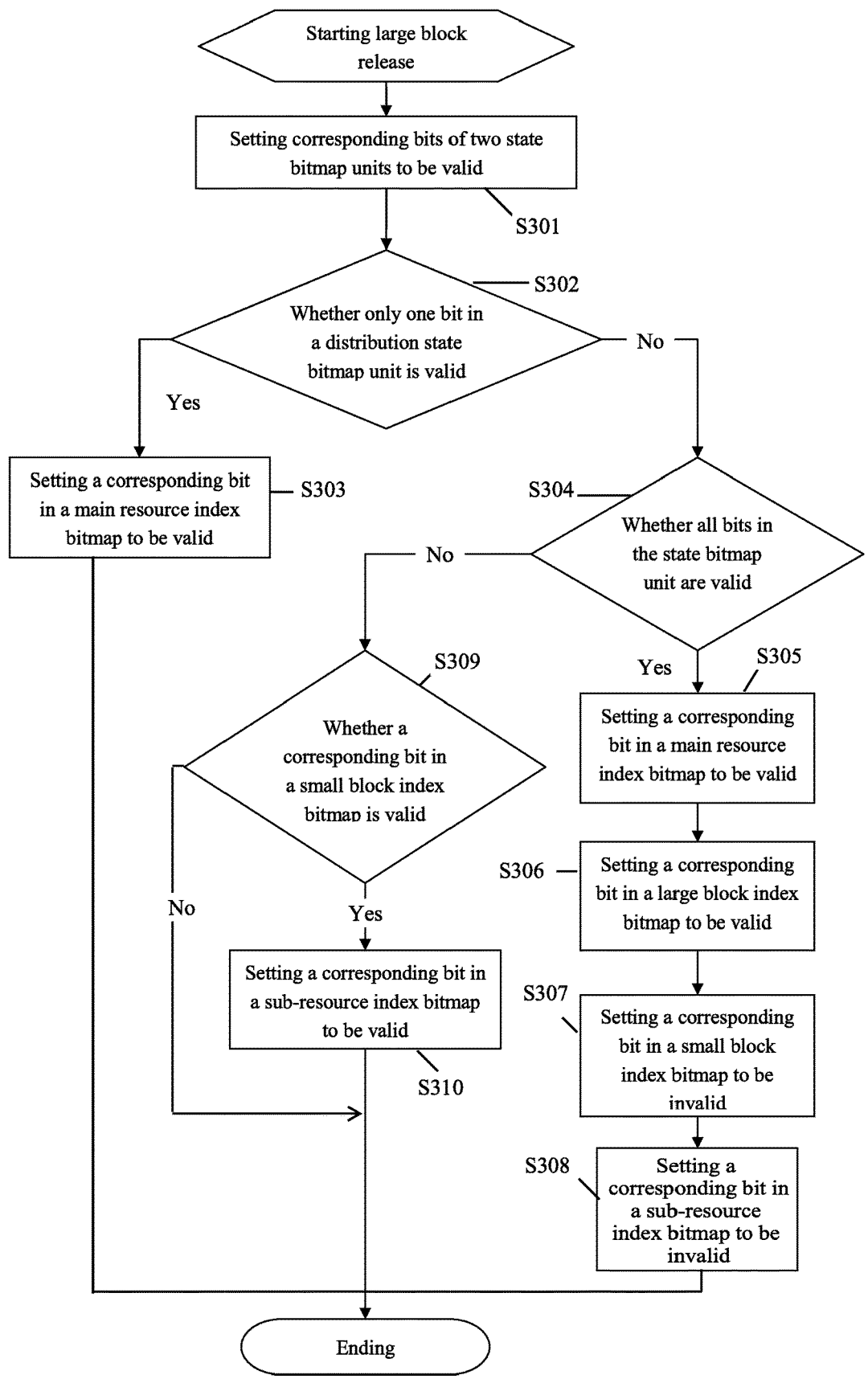
FIG. 5 is a flow chart of a method for implementing large block release in the bitmap-based storage space management system according to the preferred embodiment of the present invention.

FIG. 5 shows a process of a method for implementing the large block release in the bitmap-based storage space management system, comprising steps of:

S301, setting corresponding bits in the resource state bitmap unit and the distribution state bitmap unit to be valid, and continuing executing a step of S302;

S302, judging whether only one state bit in the distribution state bitmap unit is valid; if only one state bit is valid, executing a step of S303; if not only one state bit is valid, executing a step of S304;

S303, setting a corresponding bit in the main resource index bitmap to be valid, and ending the process; wherein when the step of S303 is executed, it is illustrated that only one bit in the distribution state bitmap unit is currently valid; and at the moment, the corresponding bit in the main resource index bitmap should be updated, so as to ensure that the distribution state bitmap unit can be found through the main resource index bitmap;

S304, judging whether all state bits in the resource state bitmap unit and the distribution state bitmap unit are valid; if all the state bits are valid, executing a step of S305; if not all the state bits are valid, executing a step of S309;

S305, setting the corresponding bit in the main resource index bitmap to be valid, and continuing executing a step of S306;

S306, setting a corresponding bit in the large block index bitmap to be valid, and continuing executing a step of S307;

S307, setting a corresponding bit in the small block index bitmap to be invalid, and continuing executing a step of S308;

S308, setting a corresponding bit in the sub-resource index bitmap to be invalid, and ending the process; wherein: a premise of implementing the steps of S305 to S308 is that all the state bits in the resource state bitmap unit and the distribution state bitmap unit are valid, which means all the storage blocks corresponding to the state bitmap unit are released, and at the moment the corresponding bits in the four index bitmaps should be back to an initial state; the execution of the steps of S305 to S308 does not have a particular order, and the execution order in the preferred embodiment is only an example;

S309, judging whether the corresponding bit in the small block index bitmap is valid; if the corresponding bit is valid, executing a step of S310; if the corresponding bit is invalid, ending the process; wherein: if some state bits in the state bitmap unit are invalid, it is illustrated that the storage space is not completely released, and the corresponding bit in the small block index bitmap is required to be checked, so as to determine whether the state bitmap unit is in the small block index bitmap; and S310, setting the corresponding bit in the sub-resource index bitmap to be valid, and ending the process; wherein: if the state bitmap unit is in the small block index bitmap, it is illustrated that the state bitmap unit is used in the small block distribution by priority, and the corresponding bit of the state bitmap unit in the sub-resource index bitmap should be ensured to be valid, so as to find the state bitmap unit comprising the idle storage block through sub-resource index bitmap at a next time.

Figure 6:
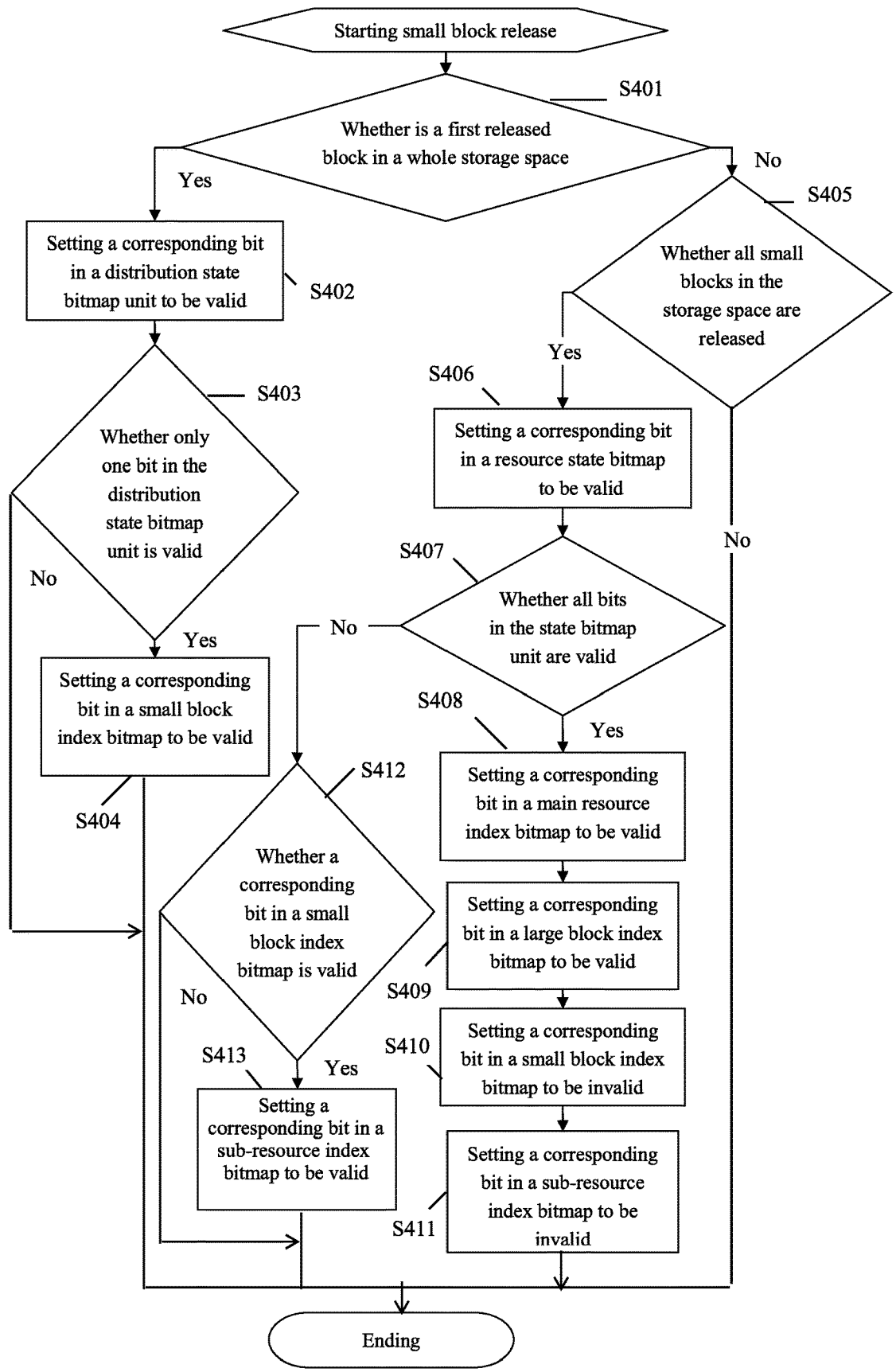
FIG. 6 is a flow chart of a method for implementing small block release in the bitmap-based storage space management system according to the preferred embodiment of the present invention.

FIG. 6 shows a process of a method for implementing the small block release in the bitmap-based storage space management system, comprising steps of:

S401, judging whether the small block to be released is a first block in the whole large block storage space; if the small block is the first block, executing a step of S402; if the small block is not the first block, executing a step of S405; wherein: judging whether the small block is the first block in the whole storage space is to check whether the corresponding large block storage space can be further divided; if the large block storage space cannot be further divided, it is illustrated that the small block to be released currently is the first idle block in the storage space;

S402, setting a corresponding bit in the distribution state bitmap unit to be valid, and continuing executing a step of S403;

S403, judging whether only one bit in the distribution state bitmap unit is valid; if only one bit is valid, executing a step of S404; if not only one bit is valid, ending the process;

S404, setting a corresponding bit in the small block index bitmap to be valid, and ending the process; wherein an object of the step of S404 is to find the distribution state bitmap unit through the small block index bitmap at a next time;

S405, checking whether all the small blocks in the storage block are released; if all the small blocks are released, executing a step of S406; if not all the small blocks are released, ending the process;

S406, setting a corresponding bit in the resource state bitmap unit to be valid, and continuing executing a step of S407;

S407, checking whether all the state bits in the state bitmap unit (namely the resource state bitmap unit and the distribution state bitmap unit) are valid; if all the state bits are valid, illustrating that all the storage blocks in the state bitmap unit are released, and executing a step of S408; if not all the state bits are valid, executing a step of S412;

S408, setting a corresponding index bit in the main resource index bitmap to be valid, and continuing executing a step of S409;

S409, setting a corresponding index bit in the large block index bitmap to be valid, and continuing executing a step of S410;

S410, setting the corresponding index bit in the small block index bitmap to be invalid, and continuing executing a step of S411;

S411, setting a corresponding index bit in the sub-resource index bitmap to be invalid, and ending the process; wherein: the steps of S408 to S411 illustrate that all the storage blocks in the state bitmap unit are released, and the corresponding index bits is in the four index bitmaps (namely the main resource index bitmap, the large block index bitmap, the small block index bitmap and the sub-resource index bitmap) are returned back to the initial state; and, the execution of the steps of S408 to S411 does not have a particular order, and the execution order in the preferred embodiment is only an example;

S412, judging whether the corresponding bit in the small block index bitmap is valid; if the bit is valid, executing a step of S413; if the bit is invalid, ending the process; and S413, setting the corresponding bit in the sub-resource index bitmap to be valid, and ending the process; wherein: in the step of S413, it should be ensured that in the small block index bitmap, the corresponding bit of the state bitmap unit in the sub-resource index bitmap is valid, so as to find the state bitmap unit comprising the idle storage block through the sub-resource index bitmap at a next time.

According to the present invention, the storage can be a random access memory (RAM), a hard disk, a flash memory, a read only memory (ROM) and a light disk (such as CDROM and DVD) and is not limited thereto. Any device can be used in recording a presence and an absence of a signal, high and low electrical levels, positive and negative magnetism, high and low lights and quantum states belongs to the scope of storage.

In the practical application, one skilled in the art will further understand that: combined with the various logical blocks, modules and steps described in the disclosed preferred embodiment of the present invention, when implementing the described functions in the storage medium such as the disk and the flash memory, the bitmap can be divided into a plurality of small blocks, and then the associated part among the bitmaps are collected to one unit block of the storage medium to be managed. Therefore, the multiple bitmaps can be modified in one unit block of the storage medium, which decreases an IO (input/output) number when modifying the bitmap in the storage medium and greatly improves the performance. For a particular application, one skilled in the art can adopt the different dividing and combination manner of the bitmap to realize the function, but the application should not be explained as departing from the scope of the present invention.

The above description of the disclosed preferred embodiment of the present invention is for letting one skilled in the art be able to produce or use the present invention. For one skilled in the art, various modifications based on the present invention are obvious. Thus, the universal principle defined in the present invention can be applied in other variations without departing from the spirit or scope of the present invention. Therefore, the present invention is not limited to the described examples and designs, but has a most wide scope consistent with the principle and novelty features disclosed in the present invention.

What is claimed is:

1. A bitmap-based storage space management system, comprising:
    an index bitmap configuration module, for configuring index bitmaps at an upper layer, wherein the index bitmaps comprise a main resource index bitmap, a large block index bitmap, a sub-resource index bitmap and a small block index bitmap; and
    a state bitmap configuration module, for configuring state bitmaps at a lower layer, wherein the state bitmaps comprise a resource state bitmap and a distribution state bitmap which are paratactic; a resource state bit of the resource state bitmap and a distribution state bit at a corresponding position of the distribution state bitmap correspond to a same storage block in a storage space; a plurality of resource state bits constitute a resource state bitmap unit; a plurality of distribution state bits constitute a distribution state bitmap unit; one resource state bitmap unit and one corresponding distribution state bitmap unit constitute a state bitmap unit; a binary value of each bit in the resource state bitmap indicates whether a corresponding storage block is occupied, and a binary value of each bit in the distribution state bitmap indicates whether the corresponding storage block is able to be further divided;

wherein: each index bit of the index bitmaps corresponds to one state bitmap unit; based on a binary value of each index bit, whether the index bit is valid is indicated; the main resource index bitmap is for indexing a state bitmap unit which comprises an idle storage block and is not used in large block distribution or small block distribution; the sub-resource index bitmap is for indexing a state bitmap unit which is used in the small block distribution without all resource state bits being occupied; the large block index bitmap is for indexing a state bitmap unit able to be used in the large block distribution; and the small block index bitmap is for indexing a state bitmap unit able to be used in the small block distribution;

the resource state bitmap and the distribution state bitmap of the state bitmap configuration module configure a state of each storage block in the storage space as an unoccupied divisible state, an occupied divisible state or an occupied indivisible state; when distributing a large block, the state bitmap configuration module modifies corresponding state bits of the storage block in the resource state bitmap and the distribution state bitmap at a same time, so as to configure the state of the storage block as the occupied indivisible state; when distributing small blocks, at a first operation, the corresponding state bits of the storage block in the resource state bitmap and the distribution state bitmap are modified, so as to configure the state of the storage block as the occupied divisible state; until a whole storage block is divided into the small storage blocks, the corresponding state bits of the storage block in the resource state bitmap and the distribution state bitmap are modified, so as to configure the state of the storage block as the occupied indivisible state.

2. The bitmap-based storage space management system, as recited in claim 1, wherein the index bitmap configuration module configures index bitmaps of multiple layers.

3. The bitmap-based storage space management system, as recited in claim 1, wherein: a storage block corresponding to each index bitmap of the index bitmap configuration module and each state bitmap of the state bitmap configuration module are divided into a plurality of small blocks, and correlated small blocks of each bitmap are collected together to be managed.

4. The bitmap-based storage space management system, as recited in claim 1, wherein:

when implementing large block distribution, according to a priority sequence of the large block index bitmap, the main resource index bitmap and the sub-resource index bitmap, the bitmap-based storage space management system finds a valid index bit of a state bitmap unit able to be used in the large block distribution;

responsive to finding the valid index bit in the large block index bitmap, a corresponding index bit in the main resource index bitmap is ensured to be invalid; responsive to finding the valid index bit in the main resource index bitmap, a corresponding index bit in the large block index bitmap is set to be valid, and simultaneously the index bit in the main resource index bitmap is set to be invalid; responsive to finding the valid index bit in the sub-resource index bitmap, the bitmap-based storage space management system finds a residual storage block able to be used in the large block distribution in a state bitmap unit used in the small block distribution;

after finding the valid index bit, the bitmap-based storage space management system finds a distributable storage block in a corresponding resource state bitmap unit, and a logical address of the distributable storage block is returned back; and simultaneously, corresponding state bits of the distributed storage block in the resource state bitmap and the distribution state bitmap are set to be invalid; and responsive to all state bits of a current resource state bitmap unit are invalid, corresponding index bits of the current resource state bitmap unit in the index bitmaps are set to be invalid, simultaneously the bitmap-based storage space management system checks whether a distribution state bitmap unit corresponding to the resource state bitmap unit still comprises a valid state bit, and sets a state of a corresponding index bit in the small block index bitmap.

5. The bitmap-based storage space management system, as recited in claim 1, wherein:

when implementing small block distribution, according to a priority sequence of the small block index bitmap, the main resource index bitmap and the large block index bitmap, the bitmap-based storage space management system finds a valid index bit of a state bitmap unit able to be used in the small block distribution;

responsive to finding the valid index bit in the small block index bitmap, the bitmap-based storage space management system directly executes a next step; responsive to finding the valid index bit in the main resource index bitmap, corresponding index bits in the small block index bitmap and the sub-resource index bitmap are set to be valid, simultaneously corresponding index bits in the main resource index bitmap and the large block index bitmap are set to be invalid, and then the bitmap-based storage space management system executes the next step; responsive to finding the valid index bit in the large block index bitmap, the bitmap-based storage space management system directly executes the next step;

after finding the valid index bit, in a distribution state bitmap unit corresponding to the valid index bit, the bitmap-based storage space management system finds a storage block able to be used in the small block distribution; a small block is divided from the storage block able to be used in the small block distribution for implementing the small block distribution, and a state bit of a resource state bitmap unit corresponding to the storage block used in the small block distribution is ensured to be invalid;

responsive to a whole storage block is divided and distributed, a corresponding state bit in the distribution state bitmap unit is set to be invalid; and responsive to all state bits of the distribution state bitmap unit are invalid, corresponding index bits of the distribution state bitmap unit in the index bitmaps are set to be invalid.

6. The bitmap-based storage space management system, as recited in claim 1, wherein:
when implementing large block release, corresponding state bits of the storage block in a resource state bitmap unit and a distribution state bitmap unit are set to be valid;
responsive to only one state bit in the distribution state bitmap unit is valid, a state of a corresponding index bit in the main resource index bitmap is updated;
responsive to all state bits in the state bitmap unit are valid, corresponding index bits in the main resource index bitmap, the large block index bitmap, the sub-resource index bitmap and the small block index bitmap are recovered to an initial state; and
responsive to the state bitmap unit is still not be completely released, the bitmap-based storage space management system checks a corresponding index bit in the small block index bitmap, and determines whether the state bitmap unit is in the small block index bitmap; responsive to the state bitmap unit is in the small block index bitmap, a corresponding index bit of the state bitmap unit in the sub-resource index bitmap is ensured to be valid.

7. The bitmap-based storage space management system, as recited in claim 1, wherein:
when implementing small block release, the bitmap-based storage space management system checks whether a small block to be released is a first small block in a whole storage block;
responsive to the small block is the first small block in the whole storage block, a corresponding state bit in a distribution state bitmap unit is set to be valid; responsive to only one state bit in the distribution state bitmap unit is valid, a corresponding index bit of the distribution state bitmap unit in the small block index bitmap is set to be valid;
responsive to all small blocks of the storage block are released, a corresponding state bit in a resource state bitmap unit is set to be valid; when all state bits in the resource state bitmap unit and the distribution state bitmap unit are valid, corresponding index bits in the main resource index bitmap, the large block index bitmap, the sub-resource index bitmap and the small block index bitmap are recovered to an initial state; and
responsive to the small blocks of the storage block are not all released, the bitmap-based storage space management system checks a corresponding index bit in the small block index bitmap, so as to determine whether the state bitmap unit is in the small block index bitmap; responsive to the state bitmap unit is in the small block index bitmap, a corresponding index bit of the state bitmap unit in the sub-resource index bitmap is ensured to be valid.

* * * * *